United States Patent
Sethu et al.

(10) Patent No.: US 9,185,417 B2
(45) Date of Patent: Nov. 10, 2015

(54) VIDEO DECODING SWITCHABLE BETWEEN TWO MODES

(75) Inventors: Manivel Sethu, Bangalore (IN); Francois Martin, Paris (FR); Pradeep Muruganandam, Pollachi (IN); Sudeendra Maddur Gundurao, Bangalore (IN)

(73) Assignee: NXP B.V., Eindhoven (NL)

( * ) Notice: Subject to any disclaimer, the term of this patent is extended or adjusted under 35 U.S.C. 154(b) by 666 days.

(21) Appl. No.: 13/429,089

(22) Filed: Mar. 23, 2012

(65) Prior Publication Data

US 2012/0250768 A1    Oct. 4, 2012

(30) Foreign Application Priority Data

Apr. 4, 2011    (EP) ..................... 11290168

(51) Int. Cl.
| | |
|---|---|
| H04N 11/04 | (2006.01) |
| H04N 19/122 | (2014.01) |
| H04N 19/172 | (2014.01) |
| H04N 19/61 | (2014.01) |
| H04N 19/132 | (2014.01) |
| H04N 19/154 | (2014.01) |
| H04N 19/164 | (2014.01) |
| H04N 19/17 | (2014.01) |
| H04N 19/44 | (2014.01) |
| H04N 19/426 | (2014.01) |
| H04N 19/43 | (2014.01) |
| H04N 19/547 | (2014.01) |

(52) U.S. Cl.
CPC .......... *H04N 19/122* (2014.11); *H04N 19/132* (2014.11); *H04N 19/154* (2014.11); *H04N 19/164* (2014.11); *H04N 19/17* (2014.11); *H04N 19/172* (2014.11); *H04N 19/428* (2014.11); *H04N 19/43* (2014.11); *H04N 19/44* (2014.11); *H04N 19/547* (2014.11); *H04N 19/61* (2014.11)

(58) Field of Classification Search
None
See application file for complete search history.

(56) References Cited

U.S. PATENT DOCUMENTS

| 5,926,573 A | * | 7/1999 | Kim et al. ...................... 382/239 |
| 6,526,099 B1 | * | 2/2003 | Christopoulos et al. . 375/240.26 |

(Continued)

FOREIGN PATENT DOCUMENTS

| EP | 0 993 196 A2 | 4/2000 | |
| WO | WO 2011021914 A2 * | 2/2011 | ............... H04N 7/36 |

(Continued)

OTHER PUBLICATIONS

Vetro, A. et al. "On the Motion Compensation Within a Down-Conversion Decoder", SPIE Journal of Electronic Imaging, vol. 7, No. 3; pp. 616-627 (Jul. 1998).

(Continued)

*Primary Examiner* — Allen Wong
*Assistant Examiner* — Samuel D Fereja

(57) ABSTRACT

Video decoder apparatus and method, for decoding a motion-compensated transform-coded video stream. The apparatus has: a first mode in which it is operable to decode the video stream at a first resolution, and wherein a motion-compensation step of the decoding is performed in the image-domain. It also has a second mode in which it is operable to decode the video stream at a second resolution, and wherein at least one motion-compensation step is performed in the transform-domain. The decoder is adapted to switch between the two modes while decoding the video stream.

18 Claims, 9 Drawing Sheets

(56) References Cited

U.S. PATENT DOCUMENTS

| | | |
|---|---|---|
| 6,584,154 B1 | 6/2003 | Wu |
| 7,180,944 B2* | 2/2007 | Lin et al. ............... 375/240.16 |
| 2004/0126021 A1* | 7/2004 | Sull et al. ............... 382/233 |
| 2005/0058201 A1* | 3/2005 | Fernandes ............... 375/240.16 |
| 2005/0163217 A1* | 7/2005 | Shin et al. ............... 375/240.12 |
| 2006/0008038 A1* | 1/2006 | Song et al. ............... 375/350 |
| 2006/0114993 A1* | 6/2006 | Xiong et al. ............... 375/240.11 |
| 2006/0233258 A1* | 10/2006 | Holcomb ............... 375/240.21 |
| 2007/0121729 A1* | 5/2007 | Chen et al. ............... 375/240.18 |
| 2009/0238279 A1* | 9/2009 | Tu et al. ............... 375/240.16 |
| 2012/0224635 A1* | 9/2012 | Kim et al. ............... 375/240.16 |

FOREIGN PATENT DOCUMENTS

| | | |
|---|---|---|
| WO | 2012/016354 A1 | 2/2012 |
| WO | 2012/020323 A2 | 2/2012 |

OTHER PUBLICATIONS

Extended European Search Report for Application No. 11290168.1 (Jul. 26, 2012).

Vetro et al. "On the Motion Compensation Within a Down-conversion Decoder", SPIE Journal of Electronic Imaging, vol. 7, No. 3, 29 pgs. (Jul. 1998).

* cited by examiner

VIDEO DECODING SWITCHABLE BETWEEN TWO MODES

CROSS-REFERENCE TO RELATED APPLICATIONS

This application claims the priority under 35 U.S.C. §119 of European patent application no. 11290168.1, filed on Apr. 4, 2011, the contents of which are incorporated by reference herein.

This invention relates to decoding an encoded digital video stream, for rendering the video on a display. It relates particularly to a decoder which is optionally able to decode a video at a spatial resolution different from the full resolution at which that video was encoded, and to dynamically switch between decoding at the full resolution and decoding at the different resolution while the decoding is ongoing.

Many video coding algorithms exploit the temporal redundancy in a sequence of pictures (frames) forming a video by applying motion compensation between frames. Motion compensation predicts the appearance of a part of a picture based on a spatial transformation of part of another (earlier or later) frame in the sequence. Describing the picture in this way can reduce the amount of data to be transmitted, because it emulates the motion of real objects in typical natural video sequences.

At the encoder, motion vectors are calculated, by comparing the frame to be predicted with a chosen reference frame. The aim is to find (for each part of the image) the part of the reference-frame which, after geometric transformation, provides the best approximation to the frame to be predicted. Then, the approximation based on these chosen motion vectors is generated and subtracted from the original image. This yields a motion-compensated frame-difference (also known as a residual image), which is the error between the prediction (approximation) and the actual image. The motion vectors and the frame-difference are transmitted to the decoder.

At the decoder, the approximation can be constructed in the same way (on the assumption that the reference frame is already available at the decoder). A reconstructed frame is then generated by adding the motion-compensated frame-difference to the approximation. Note that the motion-compensation process at the decoder—in which the motion vectors are applied to the reference image in order to generate the approximation—is sometimes referred to as "inverse" motion compensation. This term is used to distinguish the process from the "motion compensation" process at the encoder (by which the motion-vectors are estimated). Herein, the motion-compensation at the decoder will be referred to simply as "motion-compensation".

Images can be predicted from previous frames (for P-frames) or bidirectionally from both previous and future frames (for B-frames). B-frames are typically more complicated to decode, because the image sequence must be transmitted out of order, such that the "future" frame is available in time to decode the B-frame. In most coding algorithms, not all frames are encoded using motion-compensation. Instead, "Intra"-coded frames (I-frames) are inserted periodically. An I-frame is one whose encoding does not depend on any other reference frame. The availability of I-frames prevents drift at the decoder in the case of communication errors, because it stops errors from propagating through an unlimited number of successively predicted frames.

According to several well known coding standards, such as MPEG-2 and MPEG-4, both I-frames and P-frames may be used as reference frames for motion-compensation, but B-frames may not.

Compression (reduction in the quantity of data) can be achieved by quantizing the values transmitted. This is usually also assisted by transforming the image data into a form which concentrates or compacts most of the energy into a small number of values. This leads to the idea of transform-coding.

In transform-coding, a mathematical transform is applied to the image data to be transmitted. The transform may be a (block) frequency transform, spatial-frequency transform or wavelet transform. Most commonly, the transform is a Discrete Cosine Transform (DCT), or variant thereof. The statistics of natural images are such that when a DCT is performed, most of the energy will be concentrated in a few low-frequency coefficients, while many of the high-frequency coefficients will be near zero. The high-frequency coefficients can be quantized aggressively (or even forced to zero) without excessive loss of the humanly-perceptible quality of the image.

In motion-compensated transform-coding, the transform is applied not to the original frames to be encoded, but to the motion-compensated frame-difference signal.

It is sometimes desired to play (display) a video at a resolution lower than that at which it was encoded. This may be the case if the display device on which the video is to be displayed has lower resolution than the video recording device. The lower resolution can be achieved by simply decoding the video as normal and then reducing the resolution. However, this means that the computational effort spent reconstructing the image is partly wasted, because fine detail in the image will be discarded by the reduction in resolution immediately after decoding, before the image is displayed. For this reason, it has been proposed to decode the video "directly" at the lower resolution, to minimize wasted effort. This is particularly important for mobile devices, with limited processing resources and power-capacity.

In order to overcome the drawbacks associated with down-sampling after decoding, it is known to execute down-sampling within the decoder loop of the video player as shown schematically in FIG. 2, and to thus down-sample data in the frequency domain.

Such a configuration may result in a reduction of computation operations because the amount of data to be handled is reduced. This is because sub-sampling may be carried out in the transform-domain after Variable Length code Decoding (VLD) and Inverse Quantization (IQ), and therefore the amount of data to be processed by the Inverse DCT (IDCT) and the Spatial-domain Low Resolution (SLR) Motion-Compensation (MC) will be reduced. However, a disadvantage of such a configuration is that motion-compensation (MC) is carried out using a mixture of full resolution motion vectors and down-sampled image data. This can lead to serious visual artefacts. This effect is described in more detail in "On the Motion Compensation Within a Down-conversion Decoder" by Anthony Vetro and Huifang Sun, Mitsubishi Electric ITCA, Advanced Television Laboratory, SPIE Journal of Electronic Imaging, July 1998. Although the authors of this paper offer a methodology to derive a motion compensation filter for reducing such artefacts, there has not yet been disclosed a simple, elegant and effective motion compensation filter that can serve the purpose of reducing the artefacts without defeating the purpose of reducing the computation requirements.

According to an aspect of the invention, there is provided a video decoder apparatus for decoding a motion-compensated transform-coded video stream, the apparatus having:

a first mode in which it is operable to decode the video stream at a first resolution, and wherein a motion-compensation step of the decoding is performed in the image-domain; and a second mode in which it is operable to decode the video stream at a second resolution, and wherein at least one motion-compensation step is performed in the transform-domain, the decoder being adapted to switch between the two modes while decoding the video stream.

Performing motion-compensation in the image-domain means that the reference frame for the motion-compensation procedure is in the image-domain—that is, it consists of pixel values (representing, for example, luminance or chrominance). The motion vectors are applied directly to these image pixel values—that is, the spatial transformation implied by the motion-vectors is performed on the array of pixels. The motion-compensated image is then combined (summed) with an image representing the motion-compensated frame difference, to produce a reconstructed image.

Performing motion-compensation in the transform-domain means that the reference frame for the motion-compensation procedure is in the form of transform coefficients (such as DCT coefficients). The motion vectors are applied to these coefficients in the transform domain—that is, without inverting the transform. Consequently, the motion-compensated output is also in the form of transform coefficients. This output can then be combined (usually by addition) with the transform coefficients which encode the motion-compensated frame difference, resulting in a reconstructed frame in the transform-domain. Performing the addition in the transform-domain assumes that the transform is linear and distributive over multiplication. A reconstructed picture in the image-domain can then be generated by inverting the transform (that is, applying the inverse transform to the transform-coefficients).

One way of applying motion vectors to coefficients in the transform domain is to define a filter in the transform domain that has the equivalent effect, in the transform-domain, to the motion vectors operating in the image-domain. The filter may be defined by a matrix operation, to be applied to the reference coefficients in the transform-domain.

Here, decoding refers to a process of converting an encoded stream of video data back to a viewable image. That is, decoding comprises reconstructing the image that was input to the encoder (or an approximation thereof).

The decoder provides the ability to decode the video at a first resolution (which may be the original or native resolution) using spatial-domain motion-compensation, and to decode the video at a second resolution (which may be lower than the first) using transform-domain motion-compensation. The use of transform-domain motion-compensation permits low-complexity decoding of the video, because the inverse transform can be moved outside the motion-compensation loop of the decoder.

The transform-domain motion compensation of the second mode can preferably use only a subset of the full set of transform coefficients in the video stream. Suitable choices of the subset will be described in greater detail below. The use of a subset of coefficients in this way reduces the computational cost of the decoding, by ensuring that unnecessary image detail is not decoded. Here, "unnecessary" image detail refers to detail that would be lost when the image is displayed at the second resolution.

The inverse transform, outside the motion-compensation loop, will also typically process only a subset of the transform coefficients at the full resolution. Again, this permits computational effort to be minimised. However, it may be advantageous if the transform-domain motion-compensation loop preserves a larger subset (that is a greater number) of transform coefficients than the subset used by the inverse transform. This allows image quality to be preserved in the motion compensation loop and improves the fidelity of the displayed images.

The decoder also provides the ability to switch between the two modes mid-stream, ensuring maximum flexibility. Thus, the decoder can switch between reduced-complexity decoding and full-complexity decoding at will. Preferably, the decoder can switch between the first mode and second mode immediately, on demand. This means that the first frame to be decoded after switching modes may be an I-frame, P-frame, or B-frame, in general. Switching immediately avoids delay—for example, while the decoder waits for a suitable frame (such as an I-frame) at which to switch.

In general, to decode the video stream at a resolution other than its native resolution may comprise increasing or decreasing the resolution. The change in resolution may be performed in the transform-domain, wherein additional transform coefficients are introduced or some transform coefficients are discarded. The change in resolution may also be performed in the image-domain, wherein additional pixels are introduced (for example, by interpolation) or some pixels are discarded (for example, by sub-sampling). The change in resolution may be performed by a combination of image-domain and transform-domain operations.

The decoder may be adapted to, upon switching from the first mode to the second mode, transform a reference frame for motion-compensation from the image-domain into the transform-domain.

The reference frame transformed is preferably an I- or P-frame. Also, the next frame to be decoded after switching to the second mode is preferably a P-frame (although it may alternatively be a B-frame). In the case that a P-frame is to be decoded, exactly one reference frame will need to be transformed. The transformed reference frame in the transform-domain will serve as the reference for motion-compensation in the transform-domain when decoding the next frame (in the second mode).

The decoder is preferably operable, in the second mode, to perform a motion-compensation step for a B-frame in the image domain, and when the next frame to be decoded after switching to the second mode is a B-frame, the decoder is preferably further adapted to: transform a reference frame from the image-domain to the transform-domain at the first resolution; and inverse transform the reference frame from the transform-domain back to the image-domain at the second resolution.

It may be preferable to perform motion compensation for B-frames in the image-domain, even in the second mode. This will be the case if B-frames cannot be used as reference frames for motion-compensation. If the B-frame will not be used as a reference, it is not necessary to generate it in the transform-domain; therefore, it may be simpler to generate it in the image-domain. Note that image-domain reference frames for the B-frame will already be available, since all frames are eventually converted to the image-domain, ready for display. However, these will have been decoded in the first mode and so will be available at the first resolution.

In this case, the additional operation needed is to convert the reference frames to the second resolution, ready to perform motion-compensation. This can conveniently be achieved by applying the forward transform at the first resolution, followed by applying the inverse transform at the second resolution. Performing the forward transform has the result that a transform domain reference frame is also available for use as the reference for a subsequent P frame.

As an alternative to performing the forward and inverse transforms, the reference frames for the B-frame could instead be rescaled in the image-domain. However, in this case, a transform-domain version of one or both reference frames must typically be computed separately, for use in decoding a subsequent P-frame. Therefore, for a typical prediction pattern, it is preferred to use the combination of forward and inverse transforms, as described above.

The second resolution is preferably lower than the first resolution and transforming the reference frame from the image-domain to the transform-domain preferably comprises calculating a subset of the transform coefficients for the reference frame.

A transform used for video coding is typically a discrete transform which preserves the total number of data values. That is, an N×N block of pixels would be transformed to an N×N block of transform coefficients. In this context, calculating a subset of the coefficients means that fewer coefficients are generated than the number of pixels input to the transform.

By calculating fewer than the full number of coefficients, computational effort is reduced. In the case that the transform is a frequency or space-frequency transform, the coefficients representing low frequencies will comprise a low-resolution representation of the image. The transform may be a DCT. In this case, the method comprises a custom DCT which takes a first number of pixel-values as input, and outputs a second (smaller) number of transform-coefficients as output.

The transform may be a block-transform and the subset chosen may be at least one of: a contiguous sub-block of the block of coefficients in the transform-domain; a contiguous subset of the coefficients including a coefficient at one corner of the block and being symmetrical about the main diagonal of the block; and a contiguous subset of the coefficients, chosen according to a diagonal zig-zag pattern starting from one corner of the block.

The subset is preferably chosen so as to provide a low-resolution or low-frequency approximation of the image.

The decoder is preferably adapted to, upon switching from the second mode to the first mode, inverse transform a reference frame for motion-compensation from the transform-domain into the image-domain.

When switching from the second mode, the existing available reference frames will be in the transform-domain. These are inverse transformed to the image-domain, ready for use in the motion compensation step in the first mode. The first frame to be decoded after switching to the first mode may be a P-frame or B-frame. If it is a P-frame, exactly one reference frame will need to be inverse transformed. If it is a B-frame, two reference frames may need to be inverse transformed.

The decoder may be adapted to inverse transform the reference frame into the image domain at the first resolution.

For example, in the case of a block-transform, such as the DCT, and if the second resolution is lower than the first resolution, the IDCT may be performed by zero padding the DCT coefficients of the reference frame (at the second resolution), to produce a padded DCT matrix at the first resolution. The IDCT will then inverse transform the reference frame to the image-domain at the first resolution. Preferably, calculations corresponding to the zero-padded coefficients are not performed at all, resulting in a reduction in computational effort. This results in a custom IDCT, which takes a first number of transform-coefficients as input and outputs a second, greater number of image pixel-values.

The decoder may alternatively be adapted to: inverse transform the reference frame into the image domain at a third resolution different to the first resolution; followed by resizing the frame to the first resolution.

The custom transform mentioned above may result in blocking or ringing artefacts in the reconstructed image. Therefore, it may be preferable to perform part of the resolution change using spatial domain re-sampling techniques—which may include, for example, a re-sampling filter. Here, part of the resolution change is performed by the inverse transform and a further part is performed by resizing the output of the inverse transform.

The third resolution may be greater than the second resolution; and inverse transforming the reference frame from the transform-domain to the image-domain may comprise calculating the pixel-values at the third resolution using only a smaller set of transform-coefficients, which is the set available at the second resolution.

The subset of transform-coefficients available will depend on the selection of transform-coefficients that were used in the motion-compensation loop in the second mode, before the decoder switched to the first mode. This subset may be chosen according to one of the types of pattern described previously above. Thus, the pixel-values at the third resolution may be calculated using a custom IDCT, which accepts as input a first number of coefficients and outputs a second, greater number of image pixel-values. The calculation could also be achieved by zero-padding the subset of transform coefficients, in order to provide a block of coefficients at the third resolution, followed by an inverse transform at the third resolution. However, the proposed method is more efficient than this, because the extra calculations—corresponding to padded zeroes—are avoided (that is, never evaluated).

According to a further aspect of the invention, there is provided a method of decoding a video stream that has been encoded using motion-compensated transform-coding, the method comprising:

in a first mode, decoding the video stream at a first resolution, wherein a motion-compensation step of the decoding is performed in the image-domain; and in a second mode, decoding the video stream at a second resolution, wherein at least one motion-compensation step of the decoding is performed in the transform-domain, the method further comprising switching from one mode to the other while decoding the video stream.

The method may further comprise, upon switching from the first mode to the second mode, transforming a reference frame for motion-compensation from the image-domain into the transform-domain.

In the second mode, the method preferably comprise performing a motion-compensation step for a B-frame in the image domain; and, when the next frame to be decoded after switching to the second mode is a B-frame, the method preferably comprises: transforming a reference frame from the image-domain to the transform-domain at the first resolution; and inverse transforming the reference frame from the transform-domain back to the image-domain at the second resolution.

The method preferably further comprises, upon switching from the second mode to the first mode, inverse transforming a reference frame for motion-compensation from the transform-domain into the image-domain.

Also provided is a computer program comprising computer program code means adapted to control a physical computing device to perform all the steps of any preceding claim if said program is run on a computer; and such a computer program embodied on a computer readable medium.

The invention will now be described by way of example with reference to the accompanying drawings, in which.

Aspects of the present invention provide a video decoder and method of video decoding which can switch between two different modes of decoding. One of the modes uses image-(spatial) domain motion-compensation, while the other mode uses transform-domain motion compensation. Suitable methods for these two types of motion-compensation will firstly be described, with particular reference to FIGS. 1-3. The decoders of FIGS. 1-2 perform motion-compensation in the image-domain; the decoder of FIG. 3 performs motion-compensation in the transform-domain.

A known decoding process of a known down-sampling video player is based upon conventional video decoding followed by rendering the video sequence at a reduced resolution. This is illustrated in FIG. 1.

Figure 1:
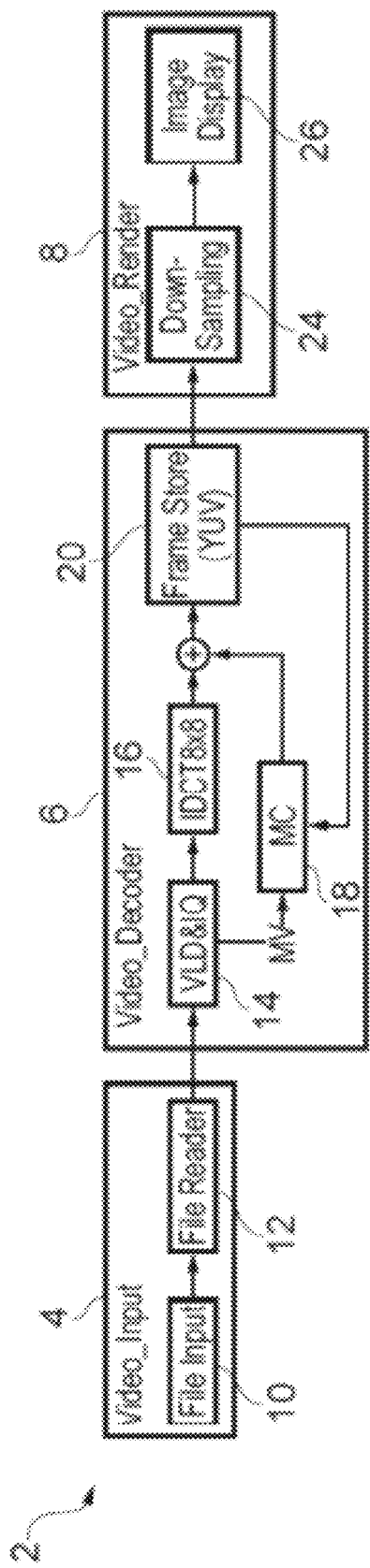
FIG. 1 is a schematic representation of a known video player in which down-sampling is carried out in the spatial domain.

Referring to FIG. 1 the video player is designated generally by the reference numeral 2. The video player comprises a video input 4, a video decoder 6 and a video renderer 8. The input of the video decoder 6 connected to the video input 4. The output of the video decoder 6 is input to the video renderer 8.

The video input comprises a file input 10 and a file reader 12 connected to the file input 10. Data is received into the video player 2 at file input 10 and is read by file reader 12. The encoded data then enters the video decoder 6 where it is decoded by a variable length decoder 14 and is also subjected to inverse quantisation. The resulting decoded frame-difference data, in the form of transform coefficients, is output to an IDCT unit 16. Here, an IDCT (Inverse Discrete Cosine Transform) is performed, to inverse-transform the data to the image domain, producing YUV pixel data. Meanwhile, decoded motion vectors MV are provided to motion compensation unit 18. Here motion compensation is performed: the motion vectors MV are applied to a reference frame stored in a frame store 20, in order to generate a predicted (or motion-compensated) frame. This is added to the inverse-transformed frame-difference signal output from the IDCT. The resulting YUV data is stored in the frame store 20 for use as a reference for subsequently received frames.

In the case of an I-frame, there is no motion compensation, therefore the output of the motion compensation unit 18 is a null frame of zeroes. Likewise, the decoded (and inverse quantised) YUV data produced by the variable length decoder 14 is the actual decoded frame, rather than a motion-compensation residual. In the case of a P-frame, the motion compensation unit 18 will receive and operate on one previously decoded frame, to generate a predicted frame. In the case of a B-frame, the motion compensation unit 18 will receive and operate on two previously decoded frames, in order to generate this prediction.

The decoded YUV frame data from the video decoder 6 is input to the video renderer 8 in order for the image to be rendered and displayed. In the course of rendering, down-sampling 24 is performed in the spatial domain (since the data has already been Inverse-transformed at 16). The image is displayed by image display 26.

In this known approach, down-sampling of image data is performed in the spatial (image) domain, as shown in FIG. 1. Such down-sampling 24 does not result in a significant reduction of computation operations, and therefore is not always suitable for use in mobile devices.

If it is desired to display the video at full resolution, the down-sampling can simply be skipped. Equivalently, a down-sampling factor of one can be applied at stage 24.

Figure 2:
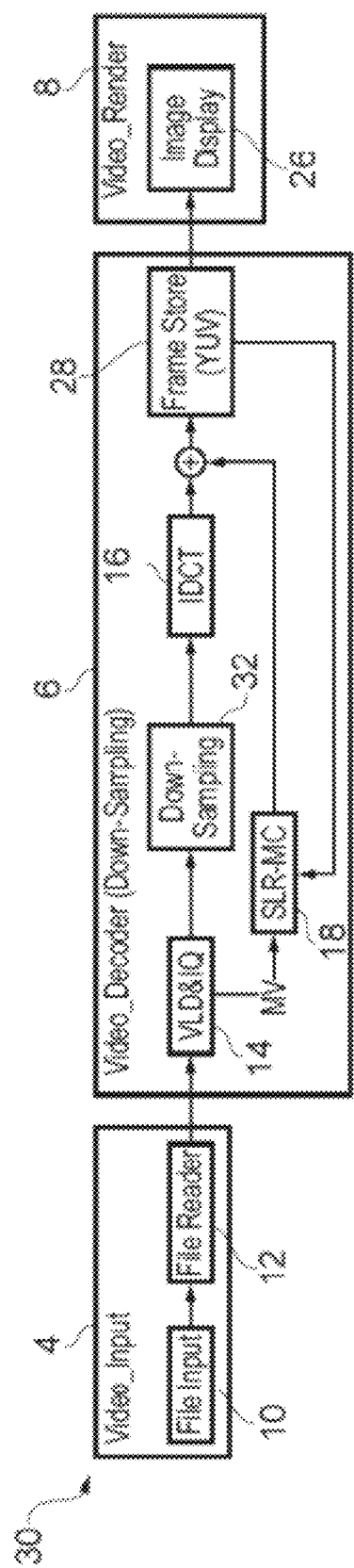
FIG. 2 is a schematic representation of a second known video player in which down-sampling is performed in the transform-domain and motion-compensation is performed at a reduced resolution in the spatial domain.

In order to overcome the problems associated with down-sampling in the spatial domain, it is also known to execute down-sampling within the decoder loop of the video player as shown schematically in FIG. 2, and to thus down-sample data in the transform-domain (here, the frequency domain).

Referring now to FIG. 2, a second known video player is illustrated and designated generally by the reference numeral 30. Parts of the video player 30 that correspond to parts of the video player 2 have been given corresponding reference numerals for ease of reference.

In the video player 30, the down-sampling is carried out in the video decoder 6 in down-sampling unit 32. The down-sampling is performed in the DCT domain, since down-sampling occurs after VLD &IQ at 14 and before IDCT at 16. This is because the down-sampling is carried out on data in DCT domain. After IDCT at 16, the decoded YUV frame is stored at store 28. This data is used as a reference frame for decoding a subsequent frame using motion compensation (MC). The MC is a spatial low resolution motion compensation (SLR-MC) process. That is, it is performed in the image (spatial) domain, at a resolution less than that of the frames in the encoded data stream. The original resolution is the resolution of the source video. For example: video at 640×480 pixels. After down-sampling by a factor of two in each (spatial) dimension, the resolution will change to 320×240, for example.

Figure 3:
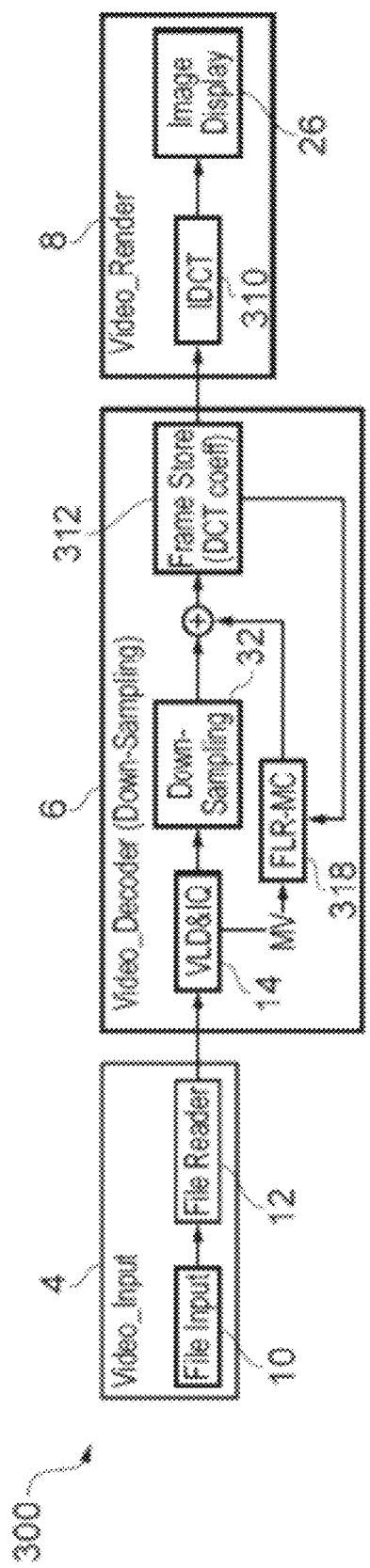
FIG. 3 is a schematic representation of a video player in which both down-sampling and motion compensation are performed in the transform-domain.

Referring now to FIG. 3, a different video player is designated generally by the reference numeral 300. Parts of the video player 300 that correspond to parts of video players 2, 30 have been given corresponding reference numerals for ease of reference.

An important feature of the video player 300 is that the inverse DCT (IDCT) 310 is taken out of the decoder loop 6 and is performed within the rendering process 8. Since the IDCT operation has been moved out of the decoder loop 6, the decoder loop will now handle data in the transform-domain only. This means that motion compensation (MC) will operate in the transform-domain (frequency domain).

As will be explained more fully below, this architecture has many advantages over other architectures of down-sampling decoders. This method of motion compensation in the DCT domain using down-sampled transform-domain data will be referred to herein as frequency domain, low resolution, motion compensation (FLR-MC) 318. Since FLR-MC works in the frequency domain, all reference data and current data are DCT coefficients and only the down-sampled DCT coefficients of a frame (and not YUV data) will be stored in frame store 312 during the decoding process.

In a down-sampling video player, the total number of arithmetic operations is very much dependent on the down-sampling process. Moreover, it also determines directly the memory size of the frame buffer for storing the down-sampled DCT coefficient. In an exemplary full-resolution decoder, the decoder handles 8×8 DCT coefficients for each DCT block. As energy in the DCT domain concentrates around the low frequency data area, down-sampling in the frequency domain can be carried out by retaining only the low frequency components of the DCT and discarding others.

One method of down-sampling in the DCT domain is to take N×N data samples from the top left of the block, where N is less than 8. This N×N square block of data is referred to herein as "first order" down-sampling.

Optionally, more refined, "second order" down-sampling can be applied. As referred to herein, "second order" down-sampling is an operation of further down-sampling of the N×N data block obtained from first order down-sampling. In second order down-sampling, the subset of DCT data chosen is not limited to a rectangular or square data block. The data can be any data subset from N×N data block. Second order down-sampling enables additional scope for reducing the number and/or complexity of computational operations in the decoder.

Figures 4, 5:
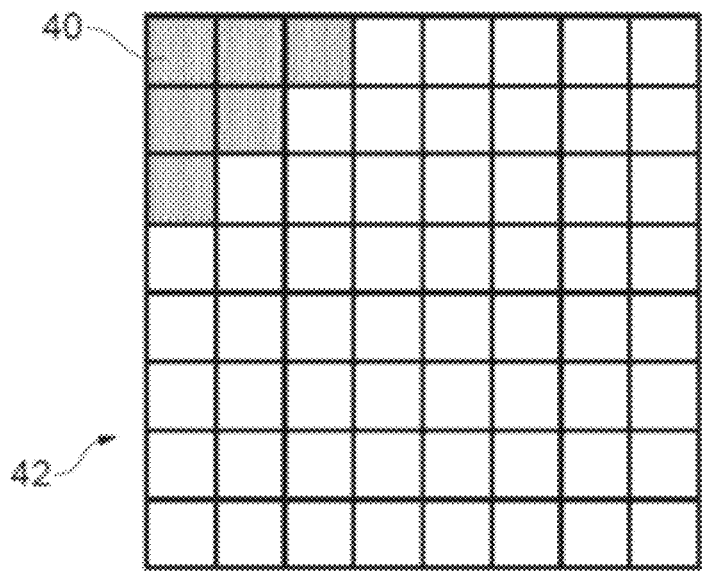
FIG. 4 shows an example of a scan-aligned down-sampling scheme.
FIG. 5 illustrates a scan-aligned scanning order.

In one embodiment, a special case of second order down-sampling is chosen, based on a desire to balance acceptable image quality against computational complexity in a mobile device. Based on this criterion, a scan-aligned down-sampling scheme is chosen as a special case of second order down-sampling. Scan-aligned down-sampling means retaining a subset of coefficients that is chosen according to the zig-zag scan typically used to order DCT coefficients for encoding. FIG. 4 shows an exemplary selection of a subset of coefficients, according to this scheme. The full zig-zag scan ordering is illustrated in FIG. 5. It is to be understood, however, that other down-sampling schemes could be used.

With N=3 and using a scan-aligned down-sampling scheme, only 6 data samples in each 8×8 DCT coefficient block will be processed. FIG. 4 shows the 6 data positions 40 on a 8×8 block 42. By taking only 6 data samples from a total of 64 data samples in a DCT block, the down-sampling saves a large amount of memory at the frame buffer. By removing high frequency data samples, degradation in image quality is expected. However the degradation is less noticeable and deemed acceptable in mobile devices as the display screens of mobile devices are generally small. Moreover, experiments suggest that users of mobile devices in general attach higher priority to the smoothness of image sequence than the image definition.

The handling of only 6 data samples reduces the number of multiplications in the motion compensation stage (to be described in greater detail below), and optionally reduces unnecessary operations in the de-quantizer in the decoder which takes place after the VLD step 14 in the decoder. Since only 6 out of 64 coefficients from each 8×8 DCT blocks are retrieved from the video compressed bit streams, de-quantization need only be performed on these 6 coefficients.

Motion compensation (MC) is the core module of a video player, and it typically consumes about 50% of computational resources in a conventional video decoder. Reducing the amount of computations in MC operation is an important consideration for improving total system performance.

Previously, down-sampling decoders such as the type illustrated in FIG. 2 have used methods of motion compensation that operate in the spatial domain, which in itself is compliant with the MPEG decoder reference model. However such a model could not be exploited by the second order sampling carried out in the present invention, since motion compensation in the spatial domain needs to deal with N×N matrices of non-zero elements.

A solution to such issues is a new methodology in motion compensation, referred to herein as frequency domain low resolution motion compensation (FLR-MC). FLR-MC operates in the frequency domain and operates on the down-sampled DCT data. Therefore, the output data remains in the DCT domain. Owing to the removal of the high frequency DCT coefficients by the second order down-sampling method, the number of operations in MC is greatly reduced. This is the most significant advantage of FLR-MC over known spatial field low-resolution motion compensation (SLR-MC).

FLR-MC can be considered as a filter for generating current down-sampled DCT coefficients from reference down-sampled DCT coefficients, by using the motion vectors of full-resolution frames. This filter is defined as a matrix which operates on reference coefficients. The filter kernel depends on the motion vectors.

To derive a suitable filter for FLR-MC, one must consider the problem of prediction drift caused by motion compensation with down-sampled data. This is a very serious artifact, and if not treated properly, the quality cannot be deemed acceptable. It is mainly due to non-ideal interpolation of sub-pel intensities and also the loss of high frequency data within a block. A full discourse on this subject can be found in the paper by Vetro and Sun, referred to previously above. The paper focuses on Motion Compensation in the spatial (image-) domain and proposes that the optimal set of filters for performing the low-resolution motion compensation is dependent on the choice of down-conversion filter.

FLR-MC is an extension of the motion compensation methodology disclosed in the paper, from the spatial domain to the frequency domain. Derivation of the filter matrix for FLR-MC will now be described.

For ease of comparison with the work of Vetro and Sun, similar mathematical notations are used in the following derivations. Vectors will be denoted with an underline and matrices will be written with an uppercase letter. For the most part, input and output blocks are in the form of vectors and filters are in the form of matrices. For notational convenience, all of the analysis will be carried out in the 1D case since the results are readily extended to 2D by ordering input and output blocks lexicographically and making appropriate extensions in the down-conversion and motion-compensation. For the 1D analysis, a block will refer to an 8×1 vector, and a macro block will consist of two 8×1 vectors. To differentiate between vectors in the spatial and DCT domain, lowercase and uppercase variables will be used respectively. In the event that a matrix does not carry an alphabetic subscript, it is assumed to be in the same domain as the vector which it is operating on.

The following arithmetic description is a 1D matrix representation. The 2D case can be derived by repeating the application for every row, and then for every column of each block.

1) In full-resolution motion compensation, the operation is expressed in matrix format as shown in (1) where $\underline{a}$ and $\underline{b}$ are two reference vectors. The motion-compensated vector is $\underline{h}$. Meanwhile, $S_{a/b}$ represents the motion compensation algorithm of a standard decoder.

$$\underline{h} = [S_a \ S_b]\begin{bmatrix} \underline{a} \\ \underline{b} \end{bmatrix}. \quad (1)$$

2) If Y represents down-sampling algorithm, $\underline{\tilde{A}}$ and $\underline{\tilde{B}}$ are the output DCT coefficient vector through down-sampling operation, then $$\underline{\tilde{A}} = Y\underline{a},$$

$$\underline{\tilde{B}} = Y\underline{b}, \quad (2)$$

3) Using the down-sampled DCT coefficient blocks as input to the FLR-MC, the following expression can be assumed:

$$\hat{\underline{H}} = [M_1 \ M_2]\begin{bmatrix} \underline{\tilde{A}} \\ \underline{\tilde{B}} \end{bmatrix} \quad (3)$$

Here, $M_1$ and $M_2$ denote the unknown frequency filters for performing FLR-MC.

4) Based on the conclusions of Vetro and Sun, the frequency filters $M_1$ and $M_2$ can be derived as follow:

$$M_1 = YS_a Y^+,$$

$$M_2 = YS_b Y^+. \quad (4)$$

Where $$Y^+ = Y^T (YY^T)^{-1} \quad (5)$$

5) In the present example, the down-sampling operation is assumed:

$$Y = [I_m \ 0]D_8 \quad (6)$$

$$Y' = D_8^T [I_m \ 0]^T \quad (7)$$

Where $D_8$ is 8×8 block DCT transform. $I_m$ represents a m×m (m<8) identity matrix. $[I_m \ 0]$ represents m×1 data truncation.

In the matrices $[M_1 \ M_2]$ of FLR-MC filters, the value of Y and $Y^+$ are constant. The values $M_1$ and $M_2$ are decided by the values of $S_a$ and $S_b$ respectively. If motion vectors contain only integers and sub pixels, the $S_a$ and $S_b$ matrices would have 16 cases. Then in each case, the FLR-MC filters matrix contain m×2m elements. These elements keep to a rule. Take the following 4×8 matrix for example:

$$[M_1 \ M_2] = \begin{bmatrix} a_{00} & -a_{10} & a_{20} & -a_{30} & 1-a_{00} & a_{10} & -a_{20} & a_{30} \\ a_{10} & a_{11} & -a_{21} & a_{31} & -a_{10} & a_{15} & -a_{25} & a_{31} \\ a_{20} & a_{21} & a_{22} & -a_{32} & -a_{20} & a_{25} & a_{26} & -a_{36} \\ a_{30} & a_{31} & a_{32} & a_{33} & -a_{30} & a_{31} & a_{36} & a_{37} \end{bmatrix}$$

When 3×3 is chosen for the first order down-sampling, the FLR-MC filter matrix keeps to the same rule as follow:

$$[M_1 \ M_2] = \begin{bmatrix} a_{00} & -a_{10} & a_{20} & 1-a_{00} & a_{10} & -a_{20} \\ a_{10} & a_{11} & -a_{21} & -a_{10} & a_{24} & -a_{34} \\ a_{20} & a_{21} & a_{22} & -a_{20} & a_{34} & a_{35} \end{bmatrix}$$

The above filter matrix can only be found in FLR-MC in accordance with Equation 4. While in spatial domain low-resolution motion compensation, there has not been any obvious rule found in filter matrices. As shown in the above matrix for FLR-MC, repetition of some data elements in the matrix will give additional reduction in multiplications operations.

It can be deduced from this section that FLR-MC is a key process in the present invention. A simple and elegant MC filter matrix that reduces down-sampled MC artifacts and computation complexity can be found only when MC operates in frequency domain.

In second order down-sampling, only p (p<m×m) data from a cut-out block of m×m will be extracted. Owing to the use of FLR-MC, the consequence of removing some data (m*m−p) samples from a cut-out block is a reduction of much matrix multiplication. For a 3×3 case in first order down-sampling, when only 6 data are extracted in a scan-aligned down-sampling scheme, the multiplication will be reduced by about 48%.

In contrast, SLR-MC cannot offer such performance advantage, since it has to process all data elements in a down-sampled block. For SLR-MC, regardless of first order N×N or second order down-sampling scheme, it always has to handle N×N data samples.

Another advantage of the decoder of FIG. 3 stems from the fact that the IDCT process has been moved from the video decoder 6 to the video renderer 8.

Considering a video player system in a resource limited mobile device, the number of frames that are actually rendered successfully is very often less than the number of frames being decoded, especially when the player performs a jump operation, or decodes complex video frames which require computation resources at the limit or exceeding the platform capability. Under such circumstances, resources have been used for decoding but the frames are not rendered, this is a waste of CPU resources.

The architecture of FIG. 3 effectively swaps the sequence of MC and IDCT. This allows IDCT operation to be integrated with the renderer. Such arrangement has advantages in a resource limited system, such as mobile telephones. In this system, IDCT operates on m×m (m<8) down-sampled block instead of 8×8. It can be considered as part of the rendering process in the video decoder and OCT operation will therefore be executed only when the player needs to output a YUV image. This is referred to as inverse DCT just in time or JIT-IDCT.

Figure 6:
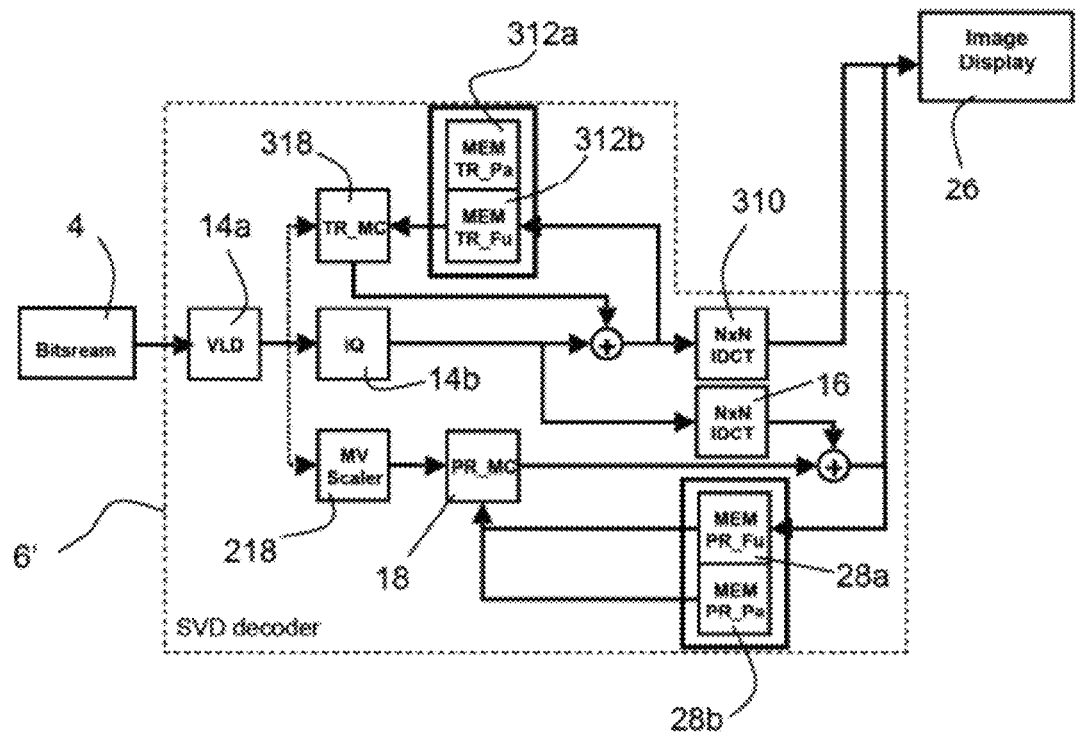
FIG. 6 shows a video player which comprises a hybrid decoder based on the decoders of FIGS. 2 and 3.

FIG. 6 shows a modified version of the decoder of FIG. 3. This uses transform-domain motion-compensation for P-frames and image-domain motion compensation for B-frames. Since B-frames are not used as subsequent reference frames, the N×N IDCT output of I- and P-frames are used as reference frames and motion compensation performed. The decoder 6' of FIG. 6 is therefore a hybrid of the decoders of FIGS. 2 and 3.

The down-sampling block 32 of FIGS. 2 and 3 is omitted in FIG. 6. It is assumed that the VLD process 14a decodes from the bitstream only those coefficients which are needed for the reduced-resolution video decoding (or "Scalable Video Decoding"—SVD). That is, the down-sampling is performed implicitly by the VLD block 14a. Note also that in FIG. 6 the IQ process is shown separately, by block 14b. Framestore 28 of FIG. 2 is shown in greater detail as a memory 28a for a future reference frame, reduced resolution in the pixel domain ("PR_Fu") and memory 28b for a past reference frame, at reduced resolution, in the pixel domain ("PR_Pa"). Similarly, frame store 312 of FIG. 3 is shown by a memory 312a for a past reference frame, stored at reduced resolution, in the transform domain ("TR_Pa") and a memory 312b for a future reference frame, at reduced resolution, in the transform domain ("TR_Fu").

The other difference between the diagrams is that a motion vector (MV) scaler 218 is shown explicitly in FIG. 6, but not in FIG. 2. This scales the motion vectors for the image-domain motion-compensation step 18, so that they are consistent with the reduced resolution versions of the reference images.

As will be clear from a comparison of FIGS. 2 and 3 with FIG. 6, and the description above, motion compensation for P-frames is performed in the transform-domain by transform-domain reduced resolution motion-compensation (TR_MC) 318 and the IDCT 310 is performed outside the motion-compensation loop. Meanwhile, motion-compensation for B-frames is performed by pixel-domain (image-domain) reduced resolution motion compensation (PR_MC) 18 and the corresponding IDCT 16 is performed within the MC loop. As will be apparent to those skilled in the art, there is no motion compensation for I-frames, whose coefficients will simply be inverse transformed by IDCT 310.

Figure 7:
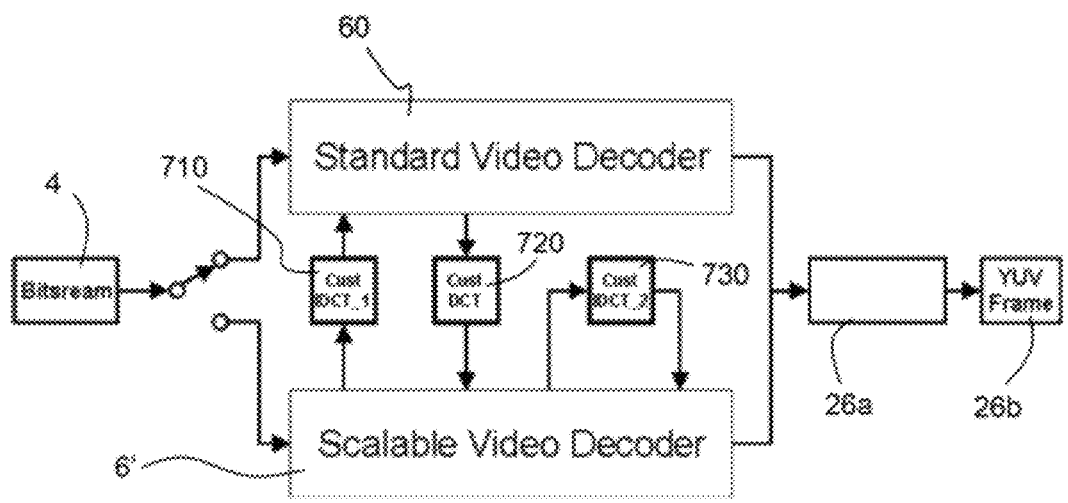
FIG. 7 shows a simplified block diagram of a video decoder according to an embodiment of the invention.

FIG. 7 shows a simplified block diagram of a decoder according to an embodiment of the invention. The decoder contains:
1.) A switch to select the mode in which the decoder is operating (standard mode or scalable mode)
2.) A first custom IDCT module 710 which converts frequency domain coefficients to pixel domain values, when switching from scalable to standard mode on P or B frames
3.) A custom DCT module 720 which converts pixel domain values to frequency domain coefficients, when switching from standard to scalable mode on P frames
4.) A second custom IDCT module 730 which converts frequency domain coefficients to pixel domain values, when switching from standard to scalable mode on B frames.

Figure 8:
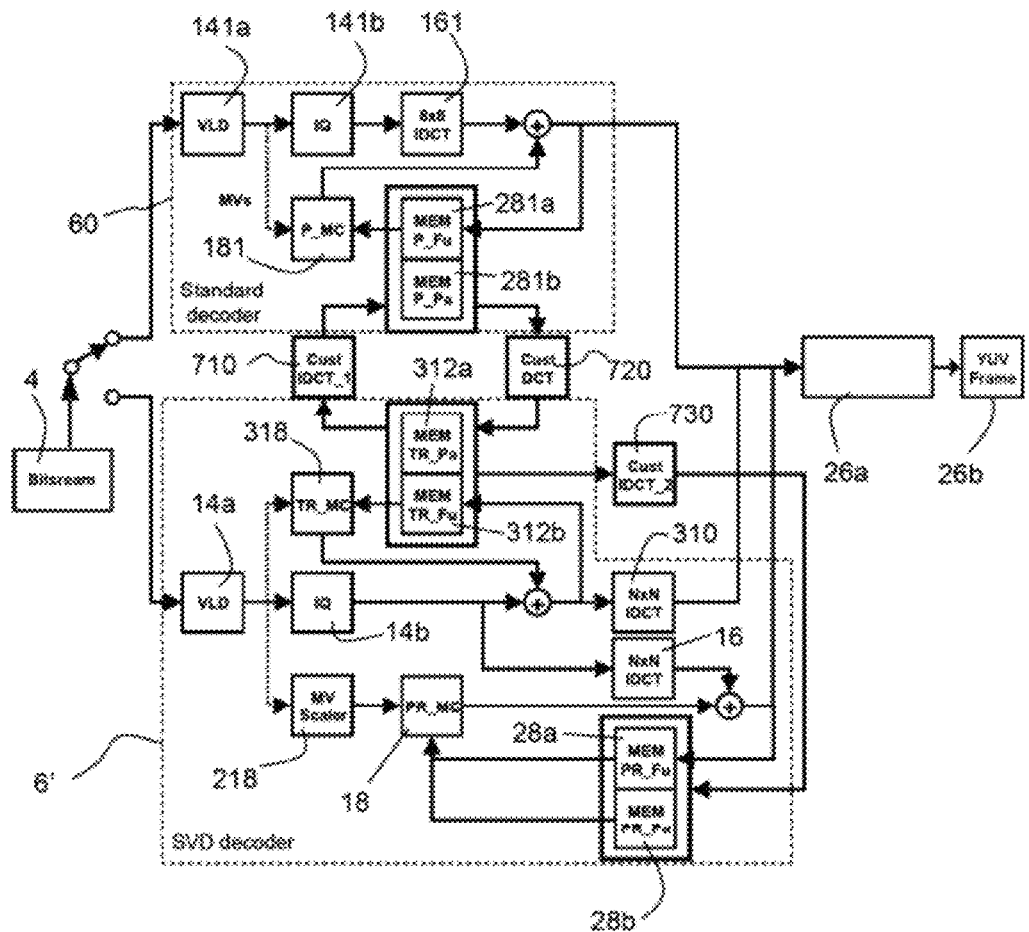
FIG. 8 is a more detailed diagram for the embodiment of FIG. 7.

It also contains a standard decoder 60, depicted in greater detail in FIG. 8, which decodes the video bitstream in full-resolution; and a scalable video decoder 6', which decodes the video in reduced resolution. The scalable decoder 6' is as shown in FIG. 6. The standard decoder 60 may be of a conventional construction.

Briefly, the standard decoder 60 comprises a VLD unit 141a which performs variable length decoding of the full bitstream. The output of the VLD block 141a is input to IQ unit 141b. Here, the transform-coefficients are inverse quantized in the normal manner. VLD unit 141a also outputs motion vectors (MV) to a pixel-domain (that is, image-domain) motion-compensation ("P_MC") unit 181. The inverse quantized transform-coefficients output from the IQ unit 141b are input to the (full 8×8) IDCT processor 161. The output of this unit 161 is a full-resolution frame-difference image in the image-domain. The output frame from the P_MC unit 181 is added to the frame-difference image, to produce a reconstructed image. This is delivered to YUV frame switch and buffer management unit 26a and also to a frame-store 281a, 281b, for use as a reference image for motion-compensation of subsequently decoded frames. Unit 26a selects between the outputs of the two different decoding paths. When switching between resolutions, it also manages the buffer memory for frame storage, so as to optimise memory usage.

Switching from standard to scalable mode will now be described.

As described in the earlier sections, the standard mode uses image-domain pixels as the reference for MC. In scalable mode, transform-domain samples are used as reference. Hence, in order to decode the switching frame, a custom forward DCT of the reference frame is taken and used as reference. Since in scalable decoding mode a very limited set of frequency coefficients is used, the forward DCT is computed in one of the patterns illustrated in FIG. 9.

In the present embodiment, a limited selection of resolutions is used. These are chosen dependent on the size of the N×N block transform defined in the standard decoder. For instance in the case of the 8×8 DCT the possible scaling ratios are 1/8, 2/8, . . . 7/8. This corresponds to the selection of an integer number of coefficients as a sub-block of the normal 8×8 block. In the present example the set has been further limited to ratios between 1/8 and 4/8. It has been found that higher ratios do not provide such a significant improvement in efficiency, compared with normal decoding.

Figure 9:
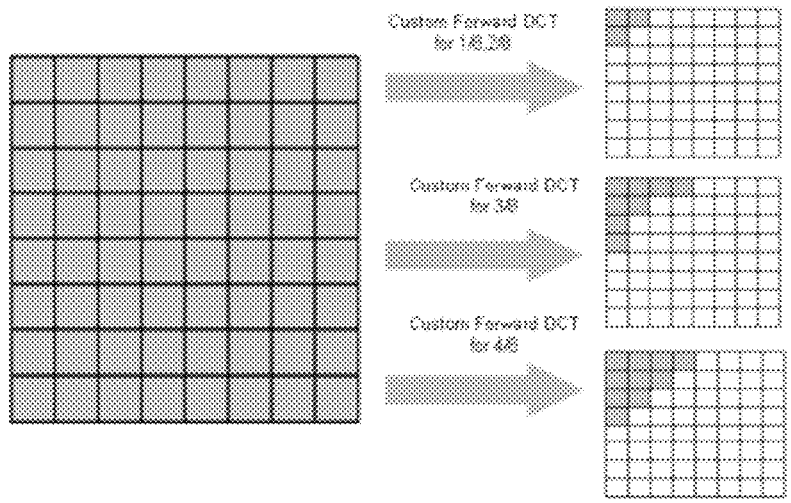
FIG. 9 illustrates patterns suitable for choosing a subset of transform-coefficients for transform-domain motion compensation in the second mode.

Another consideration is that the pattern of selected coefficients used for the transform-domain motion compensation (FLR-MC), as illustrated in FIG. 4, can be different from the pattern used in the IDCT for displaying the image (JIT IDCT). Experiments have shown that it is preferable to retain more coefficients in the decoding loop than are used in the JIT-IDCT, so that a sufficient level of quality is preserved. FIG. 9 shows the patterns of the coefficients retained in the decoding loop, for each of the ratios supported according to the present embodiment. The same patterns are applied in the custom DCT 720 for converting reference frames between the standard decoder and the SVD decoder.

Figure 10:
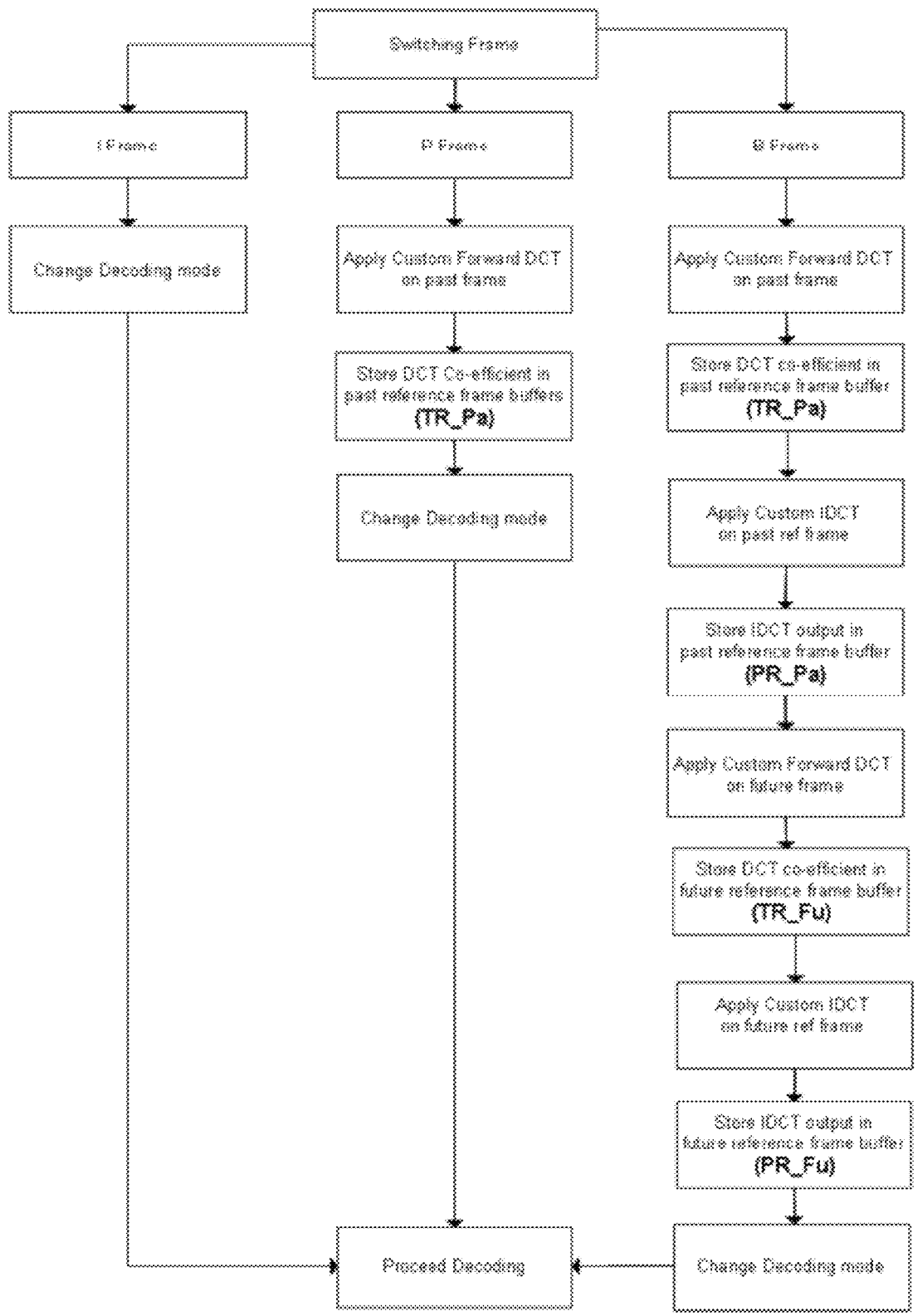
FIG. 10 is a flowchart showing how to switch from the first mode to the second mode according to an embodiment.

The complexity of computing the forward DCT is greatly reduced as only a few frequency coefficients are computed, based on the desired kernel size. The size of the kernel and number of DCT coefficients computed will determine the resolution of the decoded output image. FIG. 10 shows the procedure of how the switching is handled for various frame types.

If the switching frame is an I-frame, the decoding mode can be changed directly as it does not use any reference frames. If the switching frame is P-frame, then a forward DCT 720 is applied to its reference frame, and subsequently used in frequency domain motion compensation. For the avoidance of doubt, the term "switching frame" refers to the first frame to be decoded following the change from one decoding mode to the other.

For a B-frame, there are two reference frames (past and future) and the reference frames 281a, 281b are in the image-domain. Hence the reference frames are computed as follows:
1.) Custom forward DCT 720 is applied to past and future reference frames and stored in reference frame buffers 312a, 312b (TR_Pa and TR_Fu)
2.) The past and future reference frames are resized to scalable mode output size using custom IDCT 730 and stored in scalable mode reference frame memory 28b, 28a (PR_Pa and PR_Fu) and used as references.

For B-frames, the cost of switching is therefore relatively high because a custom forward DCT has to be applied on future and past reference frames, and both past and future reference frames have to be resized from standard to scalable mode output. As an alternative, in a CPU load constrained environment, the B-frame could be skipped and the next available I/P frame could be the switching frame.

A first embodiment of a procedure for switching from scalable to standard mode will now be described.

Figure 11:
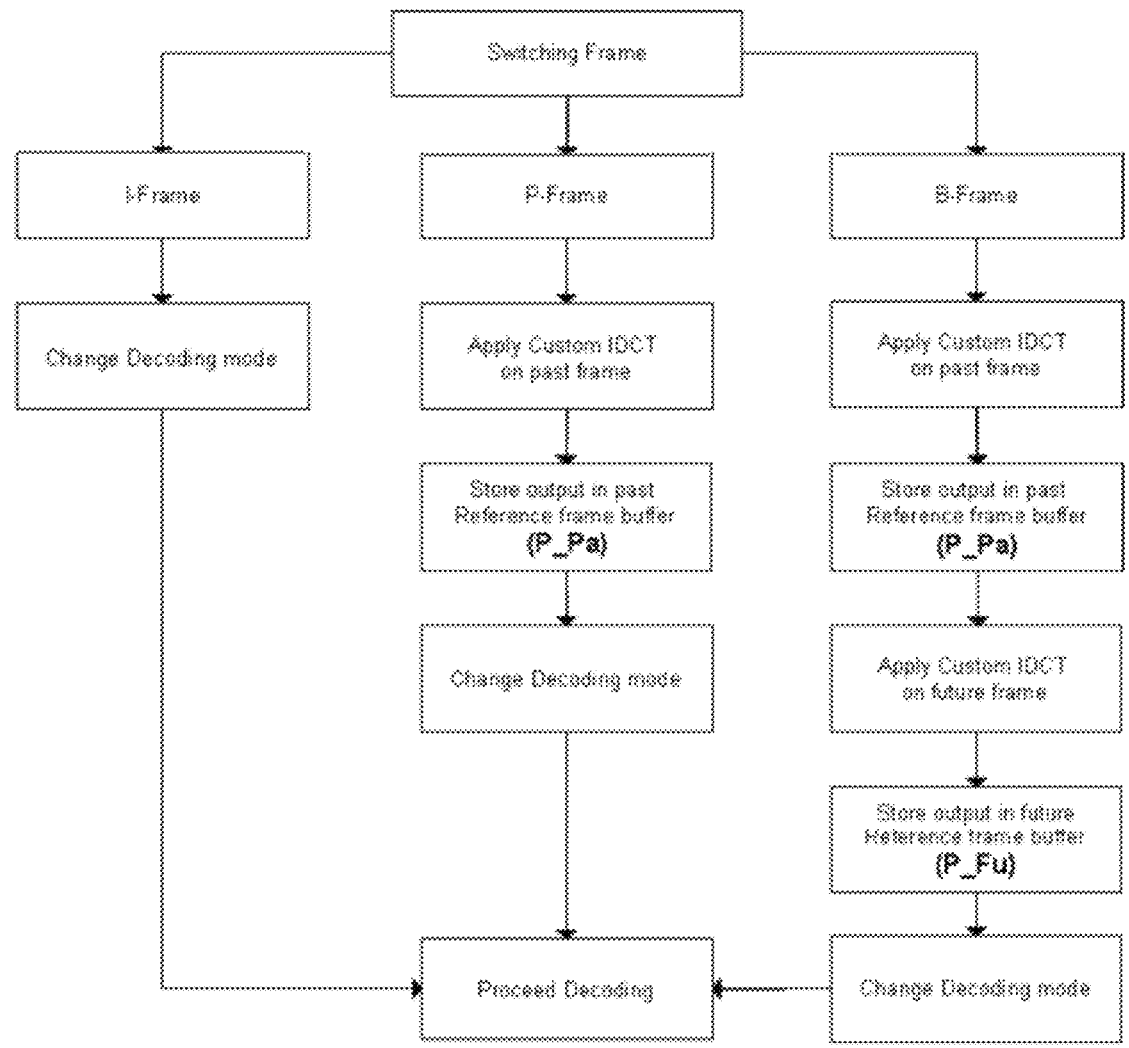
FIG. 11 is a flowchart showing how to switch from the second mode to the first mode according to an embodiment.

For switching from scalable mode to standard mode, an IDCT 710 can be applied to obtain image-domain reference frames 281a, 281b from frequency domain reference frames 312a, 312b. Depending on the rescaling factor at which the decoder is currently operating, the complexity of the IDCT module can be controlled. FIG. 11 shows a procedure for switching for the various frame types.

If the switching frame is an I-frame, the decoding mode can be changed directly as it does not use any reference frames. If the switching frame is a P-frame, then a custom IDCT 710 is applied to its reference frame, and the result is subsequently used in pixel domain motion compensation. For a B-frame, there are two reference frames (past and future) and the reference frames 312a, 312b are in the frequency-domain. Hence the reference frames are computed as follows: Custom IDCT 710 is applied to past and future reference frames and the results are stored in reference frame buffers 281a, 281b (P_Pa and P_Fu)

The custom IDCT patterns are identical to those for the custom DCT illustrated in FIG. 9. For the 1/8 and 2/8 rescaling factors, only the DC (zero frequency), first horizontal, and first vertical transform-coefficients are available. Hence by applying an 8×8 IDCT on these coefficients, a full 8×8 reference block is obtained. For 3/8 and 4/8 rescaling factors, 8 and 10 frequency coefficients are available, respectively, and these are used in the IDCT process to obtain the 8×8 reference block in a similar manner. Calculations corresponding to absent (zero-padded) coefficients are eliminated in the custom IDCT, avoiding the waste of computational effort.

A second embodiment of a procedure for switching from scalable to standard mode will now be described.

Figure 12:
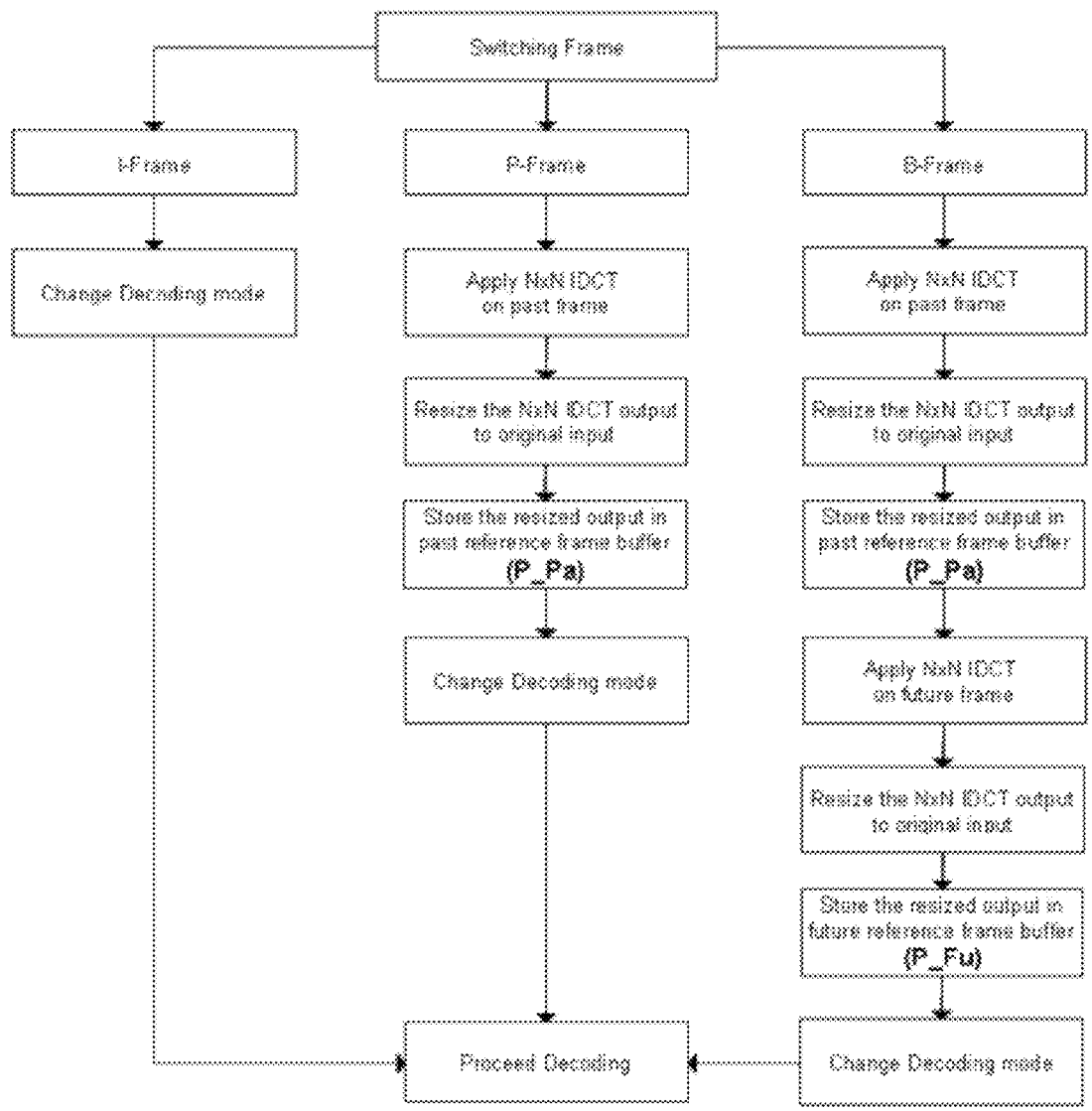
FIG. 12 is a flowchart showing an alternative to the method of FIG. 11.

In the first embodiment above, because the 8×8 custom IDCT is applied on a small subset of coefficients, the reference frames generated may contain blocking artefacts, in some circumstances. As an alternative scheme, instead of directly applying an 8×8 IDCT on the limited subset of transform-coefficients, it is proposed to apply an N×N IDCT to generate a low-resolution (N×N) reference frame in the image-domain, and then apply a resizing filter in the image-domain to obtain a reference frame at the original resolution. FIG. 12 illustrates this process.

If the switching frame is an I-frame, the decoding mode can be changed directly as it does not use any reference frames. If the switching frame is a P-frame, then a custom N×N IDCT is applied to its reference frame, pixel domain resizing is applied subsequently, and the result used in pixel domain motion compensation. For a B-frame, there are two reference frames (past and future) and the reference frames 312a, 312b are in the frequency-domain. Hence the reference frames are computed as follows: Custom IDCT is applied to past and future reference frames, pixel domain resizing is applied and stored in reference frame buffers 281a, 281b (P_Pa and P_Fu).

Switching between standard, full-resolution decoding and down-scaled decoding is useful in several applications. For example:

Smooth playback of complex video in a computationally- or power-constrained environment
Providing a Picture-in-Picture mode, when changing between two video streams or channels
When changing from a low resolution playback mode to high resolution playback
Creating active video thumbnails
Multi-caller video telephony
Fast-forward play back.

To create active video thumbnails, a video browser (for example, in a mobile phone) can display a number of video thumbnails in the screen. Each thumbnail plays concurrently, at a reduced resolution, decoded using the scalable decoding mode. The user may then select any one of the movies playing in the thumbnails to be displayed in full-screen (full resolution) mode. Because the videos are played as thumbnails using the scalable mode, the distortion-free switching mechanism allows instantaneous enlargement to the full screen (or other required size) with minimal delay.

In a multi-caller video call in a mobile phone, the person who is talking (or person of importance selected by the user) can be shown in a larger size (and higher resolution) than the other participants. For example using scalable decoding the person of importance may be shown using 3/8 decoding whereas others can be of 1/8 decoding ratio. When the user wants a full screen view of any of the participants (either standard or scalable decoding), this case is enabled by this invention.

In another application, when a video is played in a mobile phone using either the standard or scalable decoder, a user may want to fast-forward through the video. Depending upon on the speed of fast-forward desired, lower resolutions of the scalable decoding can be selected. Switching to fast forward mode and back to standard decoding can be gracefully enabled by the methods described previously above.

While the invention has been illustrated and described in detail in the drawings and foregoing description, such illustration and description are to be considered illustrative or exemplary and not restrictive; the invention is not limited to the disclosed embodiments.

For instance, the embodiments described above concentrate on video coding standards based on the 8×8 DCT. Nevertheless, as will be apparent to those skilled in the art by now, the invention is equally applicable to other coding schemes using different types of transform or using different block sizes. These schemes include, but are not limited to H.264, VP8, and VC1.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

For convenience, the following glossary of acronyms used in the description and drawings is provided:

| | |
|---|---|
| FR-MC | Frequency Domain Low Resolution Motion Compensation |
| IDCT | Inverse Discrete Cosine Transform |
| SR-MC | Spatial Domain Low Resolution Motion Compensation |
| DCT | Discrete Cosine Transform |
| VLD | Variable Length Decoding |
| IQ | Inverse Quantization |
| P_MC | Pixel Domain Motion Compensation |

| | |
|---|---|
| TR_MC | Transform Domain Reduced Resolution Motion Compensation |
| PR_MC | Pixel Domain Reduced Resolution Motion Compensation |
| MVs | Motion Vectors |
| MV_scaler | Motion vector scaler |
| MEM_P_Fu | Future reference frame Pixel Domain |
| MEM_P_Pa | Past reference frame Pixel Domain |
| MEM_TR_Fu | Future reference frame reduced resolution Transform domain |
| MEM_TR_Pa | Past reference frame reduced resolution Transform domain |
| MEM_PR_Fu | Future reference frame reduced resolution Pixel domain |
| MEM_PR_Pa | Past reference frame reduced resolution Pixel domain |
| Cust_DCT | Custom DCT from 8 × 8 pixel block to sub pattern transform block |
| Cust_IDCT_1 | Custom IDCT from sub pattern transform block to 8 × 8 pixel block |
| Cust_IDCT_2 | Custom IDCT from sub pattern transform block to N × N pixel block (N < 8) |

The invention claimed is:

1. A video decoder apparatus configured to decode a motion-compensated transform-coded video stream, wherein the video decoder apparatus comprises:
   a first video decoder configured to decode the video stream at a first resolution, wherein a motion-compensation step of the decoding is performed in an image-domain; and
   a second video decoder configured to decode the video stream at a second resolution, wherein the motion-compensation step is performed in a transform-domain after removal of high frequency data samples; and
   a switch configured to switch the video decoder apparatus between the first video decoder and the second video decoder while decoding the video stream.

2. The video decoder apparatus of claim 1, wherein the video decoder apparatus is configured to, upon switching from the first video decoder to the second video decoder, transform a reference frame for motion-compensation from the image-domain into the transform-domain.

3. The video decoder apparatus of claim 2, wherein the second resolution is lower than the first resolution and transforming the reference frame from the image-domain to the transform-domain comprises calculating only a subset of transform coefficients for the reference frame.

4. The video decoder apparatus of claim 3, wherein the transform is a block-transform and the subset of the transform coefficients is a contiguous sub-block of the block of coefficients in the transform-domain.

5. The video decoder apparatus of claim 3, wherein the subset of the transform coefficients is a contiguous subset of the coefficients including a coefficient at one corner of the block and being symmetrical about the main diagonal of the block.

6. The video decoder apparatus of claim 3, wherein the subset of the transform coefficients is a contiguous subset of the coefficients, chosen according to a diagonal zig-zag pattern starting from one corner of the block.

7. The video decoder apparatus of claim 1, wherein the second video decoder is configured to perform the motion-compensation step for a B-frame in the image domain, the next frame to be decoded after switching to the second video decoder is the B-frame, and the video decoder apparatus is further configured to transform a reference frame from the image-domain to the transform-domain at the first resolution and inverse transform the reference frame from the transform-domain back to the image-domain at the second resolution.

8. The video decoder apparatus of claim 1, wherein the video decoder apparatus is configured to, upon switching from the second video decoder to the first video decoder, inverse transform a reference frame for motion-compensation from the transform-domain into the image-domain.

9. The video decoder apparatus of claim 8, wherein the video decoder apparatus is configured to inverse transform the reference frame into the image domain at the first resolution.

10. The video decoder apparatus of claim 8, wherein the video decoder apparatus is configured to inverse transform the reference frame into the image domain at a third resolution different from the first resolution and resize the inverse transformed frame to the first resolution.

11. The video decoder apparatus of claim 10, wherein the third resolution is greater than the second resolution, and inverse transforming the reference frame from the transform-domain to the image-domain comprises calculating pixel-values at the third resolution using only a subset of transform-coefficients which is available at the second resolution.

12. The video decoder apparatus of claim 1, wherein the high frequency data samples correspond to high frequency Discrete Cosine Transform (DCT) coefficients.

13. A method of decoding a video stream that has been encoded using motion-compensated transform-coding, the method comprising:
   in a first video decoder, decoding the video stream at a first resolution, wherein a motion-compensation step of the decoding is performed in an image-domain; and
   in a second video decoder, decoding the video stream at a second resolution, wherein the motion-compensation step of the decoding is performed in a transform-domain after removal of high frequency data samples; and
   switching between the first video decoder and the second video decoder while decoding the video stream.

14. The method of claim 13, further comprising, upon switching from the first video decoder to the second video decoder:
   transforming a reference frame for motion-compensation from the image-domain into the transform-domain.

15. The method of claim 13, wherein, in the second video decoder, the method comprises:
   performing a motion-compensation step for a B-frame in the image domain, wherein, when the next frame to be decoded after switching to the second video decoder is the B-frame, the method comprises:
   transforming a reference frame from the image-domain to the transform-domain at the first resolution; and
   inverse transforming the reference frame from the transform-domain back to the image-domain at the second resolution.

16. The method of claim 13, further comprising, upon switching from the second video decoder to the first video decoder:
   inverse transforming a reference frame for motion-compensation from the transform-domain into the image-domain.

17. The method of claim 13, wherein the high frequency data samples correspond to high frequency Discrete Cosine Transform (DCT) coefficients.

18. A non-transitory computer medium comprising:
  instructions for decoding, in a first video decoder, a video stream at a first resolution, wherein a motion-compensation step of the decoding is performed in an image-domain; and
  instructions for decoding, in a second video decoder, the video stream at a second resolution, wherein the motion-compensation step of the decoding is performed in a transform-domain after removal of high frequency data samples; and
  instructions for switching between the first video decoder and the second video decoder while decoding the video stream.

* * * * *